United States Patent [19]

Suter

[11] 4,338,370
[45] Jul. 6, 1982

[54] CHEMICALLY RESISTANT COATED FABRIC

[75] Inventor: Charles A. Suter, Stow, Ohio

[73] Assignee: Goodyear Aerospace Corporation, Akron, Ohio

[21] Appl. No.: 137,946

[22] Filed: Apr. 7, 1980

[51] Int. Cl.³ .................. B32B 7/00; B32B 27/00; B32B 25/04; B32B 25/10
[52] U.S. Cl. .................. 428/250; 428/265; 428/267; 428/272; 428/421; 428/422; 428/252; 428/475.8
[58] Field of Search .......... 428/286, 284, 290, 295, 428/260, 261, 262, 265, 267, 250, 245, 246, 252, 421, 422, 520, 474, 272, 522

[56] References Cited

U.S. PATENT DOCUMENTS

| | | | |
|---|---|---|---|
| 2,713,550 | 7/1955 | Reid et al. | 428/250 X |
| 2,816,055 | 12/1957 | Semegen et al. | 428/250 |
| 2,875,116 | 2/1959 | Smith | 428/250 X |
| 3,369,959 | 2/1968 | Noyes | 428/520 |

Primary Examiner—Lorraine T. Kendell
Attorney, Agent, or Firm—P. E. Milliken; E. W. Oldham; D. J. Hudak

[57] ABSTRACT

A chemically resistant coated fabric laminate in which a rubber layer is adhered to one side of a fabric which has been dipped in a blend solution of a rubber and an adhesive. To the remaining side of the impregnated fabric is applied a rubber layer which has thereon a chemically resistant preformed film. The rubber layer containing the preformed film has a dry adhesive compound incorporated therein.

8 Claims, 1 Drawing Figure

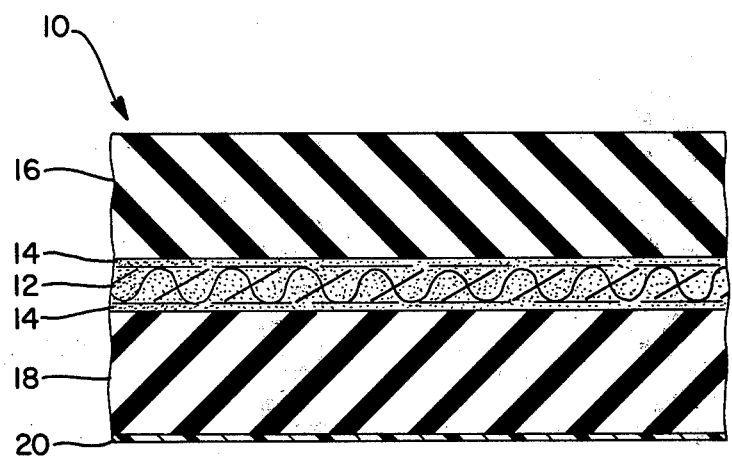

CHEMICALLY RESISTANT COATED FABRIC

BACKGROUND OF THE INVENTION

The present invention relates to a chemically resistant coated fabric laminate which may be used as a top enclosure for a chemical storage tank. The invention also relates to a chemically resistant coated fabric laminate having resistance to permeation by chemicals.

Heretofore, the commonly used chemically resistant coated fabric laminates were typically fabrics coated on either side with nitrile or polyurethane rubber.

Where it was desired that the permeation rate of a chemical being contained by the fabric be low, a barrier film was incorporated into the laminate by applying a film such as a nylon or other similar soluble coating from the solution.

An example of a complex laminate of this type is contained in U.S. Pat. No. 3,951,190 for a heat-resistant fuel cell. This invention relates to a barrier layer, such as nylon or epoxy, to contain the fuel. A fabric ply was attached to either side of the barrier layer through an adhesive. A polyurethane was then applied to the fabric ply. The side of the fabric ply adhered to the adhesive generally had a nitrile rubber coating.

Such prior art teaching the use of barriers applied from solution limits the utility of such chemically resistant coated fabric laminates, since the number and quality of available soluble barrier resins is limited. In this invention, barriers in the form of thin performed films of inert materials are used in the laminate.

The use of the thin performed films of inert materials as a barrier is simplified by using a layer of rubber, having incorporated therein, an adhesive between the film and the impregnated fabric. Prior art has always held that inert films could only be adhered to rubber by the use of a solvent-based adhesive applied to the film. This procedure is not desired in the production of rubberized fabrics due to the nature of the equipment common to the industry.

The use of dry rubber having incorporated therein an adhesive is taught in the prior art to be of utility in bonding rubber to certain woven fabrics for use in tires and rubber hose. Prior art has never shown that such a technique could be used in bonding inert films to rubber, and indeed the potential utility of such laminates has never been recognized.

SUMMARY OF THE INVENTION

It is therefore an object of the present invention to provide a chemically resistant coated fabric laminate which is tough and strong.

It is a further object of the present invention to provide a chemically resistant coated fabric laminate, as above, which is solvent resistant and has good permeability resistance.

It is another object of the present invention to provide a chemically resistant coated fabric laminate, as above, wherein the fabric is dipped in or impregnated with a rubber-phenolic adhesive solution.

It is another object of the present invention to provide a chemically resistant coated fabric laminate, as above, wherein one side of said impregnated fabric has a rubber layer adhered thereto, said rubber layer containing a dry adhesive system.

It is yet another object of the present invention to provide a chemically resistant coated fabric laminate, as above, which is economically produced.

It is yet another object of the present invention to provide a chemically resistant coated fabric laminate, as above, wherein said fabric layer is either nylon, polyester, or polypropylene.

It is yet another object of the present invention to provide a chemically resistant coated fabric laminate, as above, wherein said laminate can be utilized in such areas as impervious tank top covers, and the like.

It is yet another object of the present invention to provide a chemically resistant coated fabric laminate, as above, wherein said rubber layer contains a chemically resistant preformed coating such as polyvinylfluoride, polyvinylidene fluoride, nylon, or polytetrafluoroethylene.

These and other objects of the invention will become more apparent from the following description of the preferred embodiments.

Generally, a chemically resistant fabric laminate comprises: a fabric layer, said fabric layer impregnated with a liquid blend of a rubber and an adhesive system, said rubber made from compounds selected from the group consisting of a polymer made from a monomer of a conjugated diene having from 4 to 10 carbon atoms, nitrile rubber, and polychloroprene, a rubber layer, said rubber layer attached to and adhered to one side of said impregnated fabric, said rubber layer made from a compound selected from the group consisting of natural cis-1,4-polyisoprene, a polymer made from a monomer of a conjugated diene having from 4 to 10 carbon atoms, nitrile rubber, and polychloroprene, a substrate layer, said substrate layer comprising a blend of a rubber and a dry phenolic adhesive system, said substrate layer attached to the remaining side of said impregnated fabric layer, said rubber of said carrier layer made from a compound selected from the group consisting of a polymer made from a monomer of a conjugated diene having from 4 to 10 carbon atoms, nitrile rubber, and polychloroprene, and a chemically resistant preformed film residing on said substrate layer, said substrate layer adhering said chemically resistant preformed film to said impregnated fabric layer.

IN THE DRAWING

The FIGURE is a cross-sectional view showing the various layers of the laminate of the present invention.

DESCRIPTION OF THE PREFERRED EMBODIMENTS

According to the concepts of the present invention, a chemically resistant laminate is provided having good chemical resistance to solvents, acids, and also very low permeability to various gases.

Referring to the FIGURE the chemically resistant coated fabric laminate is generally indicated by the numeral 10. Fabric layer 12 may be of any desirable weave and is made out of polyester or nylon, (especially for solvent applications), propylene, (especially for acid applications), or combinations thereof. A weave made of such material has excellent acid as well as solvent resistance and yet provides a strong fabric.

Fabric layer 12 is generally impregnated with a blend 14 of a rubber adhesive through any conventional method such as by dipping into a rubber-adhesive solution. Generally, any suitable adhesive known to the art may be utilized, as for example, a phenolic adhesive system dissolved in any conventional solvent, for example, methyl ethyl ketone. As will be apparent to those skilled in the art, the selection of the precise rubber and adhesive is determined by the rubbers utilized at layers 16 and 18 as well as by the particular chemical environment in which the chemically resistant coated fabric laminate will be utilized. Generally, any conventional phenolic soluble resin is desirable.

Although any rubber may generally be utilized such as natural rubber, that is natural cis-1,4-polyisoprene, rubbers made from dienes having from 4 to 10 carbon atoms, for example butadiene, synthetic cis-1,4-polyisoprene, isoprene, and the like, preferably a rubber having good solvent and/or acid resistance is desired. Thus, nitrile rubbers, that is copolymers of butadiene and acrylonitrile are preferred. Similarly, polychloroprene (neoprene) is also preferred.

Fabric layer 12 may be impregnated in accordance with any conventional manner such as by knife coating, dipping, and the like. Furthermore, fabric layer 12 may only be partially impregnated, that is such that all the voids thereof are not filled by the rubber-adhesive solution. However, as shown in the drawing, it is desirable that a small layer of the rubber-adhesive system 14 actually coat the surfaces of the fabric layer 12. Such a feature promotes adhesion of layers 16 and 18 to the fabric and adds structural integrity to the overall laminate.

Outer layer 16 is comprised of a rubber which may be any of the rubbers set forth above which are utilized in adhesive rubber blend 14. Layer 16, as shown in the drawing, is generally thicker than impregnated or dipped fabric layer 12 and the coating 14 on each side thereof. Desirably, outer layer 16 is solvent and/or acid resistant and thus polychloroprene is desired with nitrile rubber being preferred. Good adhesion between layer 16 and layer 14 is obtained due to the adhesive nature of layer 14. Since outer layer 16 will generally be exposed to the elements, a small amount of various compounds known to those skilled in the art including polyvinylchloride may be added to provide good ozone resistance as well as ultraviolet light resistance.

To the remaining side of the fiber layer having the rubber adhesive blend 14 attached and actually impregnated therein, is applied substrate rubber layer 18. As with outer layer 16, the purpose of substrate layer 18 is to impart structural integrity and to protect fabric layer 12. Thus, as shown in the drawing, this layer is fairly thick and desirably has an overall thickness greater than the combination of fabric layer 12 and the rubber-adhesive layers impregnated therein and coated thereon. The rubber may be made of any of the rubbers set forth above and due to the use requirements, desirably is chloroprene and preferably is nitrile rubber. Since chemically resistant layer 20 must be adhered to the laminate, substrate layer 18 has a dry adhesive therein. In other words, whereas rubber blend 14 utilizes a wet, that is a solvent type resin or adhesive system, layer 18 incorporates a dry adhesive therein.

A specific class of dry adhesive resins which has been found to give good adhesion are the phenolic resins. These resins are well known to those skilled in the art and are heated to produce a cure or crosslink between the various polymers to produce the desirable adhesive strength. A preferred type of phenolic adhesive system involves the use of typical phenolic components, as set forth in any chemical or adhesive text book, for example, resorcinol and formaldehyde. Thus, the resorcinol can be reacted with the formaldehyde to form a methylol monomer. Condensation of the monomer during vulcanization produces resorcinol-formaldehyde resin by formation of methylene bridges. Silica catalyzes the monomer formation while retarding the formation of high molecular weight crosslinked resins. It is believed that strong adhesion results because the resorcinol-formaldehyde resin forms hydrogen bonds with the substrate. Examples of such phenolic systems containing silica include the Mobay Chemical Corporation products such as Cohedur A and Cohedur RL with silica. Additionally, Cohedur RS, a mixture of resorcinol and stearic acid, may also be utilized. Rhenogran Hexa, a hexamethylene tetraamine dispersed in an ethylene vinyl-acetate copolymer containing special dispersion agents, may be utilized as an accelerator and formaldehyde donor. Cohedur RK, resorcinol diacetate absorbed on silica, may also be utilized in conjunction with silica and formaldehyde donors such as Cohedur A. Another phenolic resin containing silica is the HRH system, a rubber compounding system by PPG Industries, and may also be utilized. The HRH system basically employs hydrated silica, resorcinol, and hexamethylene tetraamine which may be reacted in various steps to form a strong adhesive. Naturally, the present invention is not limited to these specific compounds or systems. The amount of a phenolic resin in either the rubber adhesive blend 14, or the substrate 18, ranges from about 1 to about 50 parts by weight, and preferably from about 2 to about 10, based upon 100 parts by weight of the rubber.

Layer 20, since it will encounter and/or often contact solvents, acids, as well as various other chemical compounds, is made from an inert material which has good solvent resistance, acid resistance, and is impervious to most gases. Thus, representative materials include nylon (e.g., nylon 66 or poly-$\xi$-caprolactam), polytetrafluoroethylene, polyvinylidene fluoride, or polyvinylfluoride. The thickness of the layer may be very thin since such layer is sufficient to achieve the solvent resistance, permeation resistance, etc., desired.

Laminate 10 is thus a very tough, durable and chemically resistant laminate which can be utilized in tank tops to prevent loss of the solvent or component therein. For example, the laminate may be applied to the top of a vinylchloride tank with the ends thereof attached to the tank in a gas-tight arrangement according to any conventional manner. Furthermore, the laminate may be of such a size to permit expansion through any suitable arrangement such as accordion pleats, undulations, folds, and the like, so that it can conform with variable levels in the tank. Another desired use is as seals in the chemical industry. Of course, many other uses exist as wherever a tough, resilient, and impermeable material is desired.

It should be apparent that the thicknesses of the various laminates may be varied according to need and use. Representative examples of chemicals in which the laminate 10 may be used in connection therewith include a vinyl chloride monomer, benzene, petroleum products, chlorinated solvents, for example, trichloroethylene, perchloroethylene, and the like.

Additionally, various conventional additives may be added to the various layers as known to those skilled in the art. For example, the various rubber layers may contain conventional compounding materials, for example accelerators, various amounts of carbon black, stearic acid, and the like, zinc oxide, plasticizers such as dioctyl phthalate, sulfur curatives, and the like. Thus, the various rubber layers upon formation of the blend may be cured to form a tough and yet resilient structure.

A laminate was made according to the following construction:

| COMPOUND | WEIGHT IN OZS., PER SQUARE YARD |
| --- | --- |
| Nitrile rubber (NRCG-4908, a butadiene acrylonitrile copolymer, of high (43 percent) acrylonitrile content having a polymer viscosity M/L-4 at 100° C. of 82–94, manufactured by the Goodyear Tire and Rubber Company, to which is added normal compounding ingredients. | 21.20 |
| A Nitrile rubber-phenolic adhesive blend in methyl ethyl ketone containing Chemigum N-5, a butadiene acrylonitrile copolymer of high (39 weight percent) acrylonitrile content having a polymer viscosity of M/L-4 at 100° C. of 91–109, manufactured by the Goodyear Tire and Rubber Company, to which is added normal compounding ingredients, and 30 parts by weight per 100 parts by weight of nitrile rubber of a phenolic resin 7040 manufactured by Emhart Corporation. | 2.00 |
| Nylon fabric manufactured by Burlington Industrial Fabrics Co. | 6.00 |
| A substrate layer containing 100 parts by weight of NRCG-4908 as described above, including the compounding ingredients, to which has been added 6.5 parts by weight of Cohedur RL, manufactured by Mobay Chemical Company, and 55 parts by weight of Hi-Sil (fine particle sized silica manufactured by PPG Industries), per 100 parts by weight of nitrile rubber. | 21.20 |
| Polyvinylfluoride (Tedlar film manufactured by DuPont). | 1.66 |

The laminate was made in the following manner:

The nylon fabric was first dipped into the nitrile rubber-phenolic adhesive blend solution. The nitrile rubber was than applied to one side of the fabric with a calendar. Next, the substrate layer containing the nitrile rubber and dry adhesive blend was applied to the remaining side with a calendar. Finally, the polyvinylfluoride film was adhered by passing it and the coated fabric structure between pressure rollers. The laminate so made and having the impregnated coated fabric as the center layer was then wound on a large steel drum and placed in an autoclave where the laminate was cured by steam at 280° F. for 90 minutes.

The cured laminate was removed from the roll and tested with regard to impermeability of vinylchloride vapor in the following manner.

The laminate was used as the closure on a cup containing vinylchloride monomer gas at one half psig. Measurements of vinylchloride permeating through the laminate were made by analyzing the atmosphere adjacent to the laminate for vinylchloride with a gas chromatograph. The result was a permeability of 100 cc/24 hours m²/½ psig as compared to a permeability of 1,100 cc/24 hours/m²/½ psig when a coated fabric laminate was utilized. As apparent from these tests, the construction of the present invention which is not only strong and durable, resulted in a dramatic decrease in permeability of vinylchloride vapor, a suspected carcinogen.

Having described in detail the preferred embodiments as well as the best mode, in compliance with the patent statutes for purposes of illustrating the invention, it would be understood that various changes and modifications may be made without departing from the spirit or scope of the invention. Therefore, reference is made to the appended claims.

What is claimed is:

1. A chemically resistant fabric laminate, comprising:
a woven fabric layer, said fabric layer impregnated with a blend of a rubber and an adhesive system, said rubber made from compounds selected from the group consisting of natural cis-1,4-polyisoprene, a polymer made from a monomer of a conjugated diene having from 4 to 10 carbon atoms, nitrile rubber, and polychloroprene,
a rubber layer, said rubber layer directly attached to and adhered to one side of said impregnated fabric, said rubber layer made from a compound selected from the group consisting of natural cis-1,4-polyisoprene, a polymer made from a monomer of a conjugated diene having from 4 to 10 carbon atoms, nitrile rubber, and polychloroprene,
a substrate layer, said substrate layer comprising a blend of a rubber and a dry phenolic adhesive system, said substrate layer directly attached and adhered to the remaining side of said impregnated fabric layer, said rubber of said substrate layer made from a compound selected from the group consisting of natural cis-1,4-polyisoprene, a polymer made from a monomer of a conjugated diene having from 4 to 10 carbon atoms, nitrile rubber, and polychloroprene, and
a chemically resistant preformed film residing on said substrate layer, said substrate layer directly adhering said chemical resistant preformed film to said impregnated fabric layer.

2. A chemically resistant fabric laminate according to claim 1, wherein said fabric is selected from the group consisting of polyester, nylon, and polypropylene, wherein said adhesive in said adhesive rubber blend impregnating said fabric is a phenolic adhesive, the amount of said phenolic adhesive ranging from about 1 to about 50 parts by weight based upon 100 parts of said rubber, and wherein said chemically resistant film is selected from the group consisting of polyvinylfluoride, polyvinylidene fluoride, polytetrafluroethylene, and nylon.

3. A chemically resistant fabric laminate according to claim 2, wherein said rubber in said blend of rubber and phenolic adhesion is selected from the group consisting of nitrile rubber and polychloroprene, wherein the rubber in said rubber layer is selected from the group consisting of nitrile rubber and polychloroprene, and wherein the rubber in said substrate layer is selected from the group consisting of nitrile rubber and polychloroprene.

4. A chemically resistant fabric laminate according to claim 3, wherein the amount of said dry phenolic adhesive system in said substrate layer ranges from about 1 to about 50 parts by weight per 100 parts of said rubber.

5. A chemically resistant fabric laminate according to claim 4, wherein said substrate layer adhesive system before curing contained resorcinol.

6. A chemically resistant fabric laminate according to claim 4, wherein the amount of said phenolic in said substrate layer ranges from about 2 to about 10 parts by weight.

7. A chemically resistant fabric laminate according to claim 6, wherein said rubber impregnating said fabric is nitrile rubber, wherein said rubber in said substrate layer is nitrile rubber, and wherein said chemically resistant film is polyvinylfluoride.

8. A chemical resistant fabric laminate according to claims 1, 3, 4, 6, or 7, wherein said dry phenolic adhesive system contains silica.

* * * * *